United States Patent
Sinn et al.

(10) Patent No.: US 10,630,211 B2
(45) Date of Patent: Apr. 21, 2020

(54) DEVICE FOR AN ELECTRIC MACHINE, IN PARTICULAR OF A MOTOR VEHICLE

(71) Applicant: Robert Bosch GmbH, Stuttgart (DE)

(72) Inventors: Peter Sinn, Untergruppenbach (DE);
Thomas Saile, Forchtenberg (DE);
Volker Weeber, Lauffen A.N. (DE)

(73) Assignee: Robert Bosch GmbH, Stuttgart (JP)

( * ) Notice: Subject to any disclaimer, the term of this patent is extended or adjusted under 35 U.S.C. 154(b) by 0 days.

(21) Appl. No.: 16/311,952

(22) PCT Filed: Apr. 12, 2017

(86) PCT No.: PCT/EP2017/058888
§ 371 (c)(1),
(2) Date: Dec. 20, 2018

(87) PCT Pub. No.: WO2018/001590
PCT Pub. Date: Jan. 4, 2018

(65) Prior Publication Data
US 2019/0207540 A1 Jul. 4, 2019

(30) Foreign Application Priority Data
Jun. 27, 2016 (DE) .................. 10 2016 211 423

(51) Int. Cl.
*H02P 3/18* (2006.01)
*B60L 7/22* (2006.01)
(Continued)

(52) U.S. Cl.
CPC .............. *H02P 3/18* (2013.01); *B60L 3/003* (2013.01); *B60L 7/22* (2013.01); *H02J 7/0031* (2013.01); *H02P 27/06* (2013.01)

(58) Field of Classification Search
CPC .... H02P 1/00; H02P 1/029; H02P 1/04; H02P 1/08; H02P 1/10; H02P 1/12; H02P 1/163;
(Continued)

(56) References Cited

U.S. PATENT DOCUMENTS 5,932,974 A 8/1999 Wood
7,571,683 B2 * 8/2009 Kumar .................. B60L 9/16
105/35

(Continued)

FOREIGN PATENT DOCUMENTS

DE 102011075509 A1 * 11/2012 .............. B60L 50/51
DE 102011075509 A1 11/2012

OTHER PUBLICATIONS

International Search Report for PCT/EP2017/058888, dated Jul. 13, 2017.

*Primary Examiner* — Antony M Paul
(74) *Attorney, Agent, or Firm* — Norton Rose Fulbright US LLP; Gerard Messina

(57) ABSTRACT

A device for operating an electric machine, it being possible for the electric machine to be at least operated in generator mode, having an electrical energy accumulator that is connected to the electric machine by an electrical circuit that has a main switch; the circuit having a motor brake circuit that is designed to feed the electrical energy generated by the electric machine in generator mode to the energy accumulator. It is provided that the motor brake circuit be designed to convert the electrical energy into heat in the case of a failure of the main switch, of a connection of the circuit to the energy accumulator and/or of the energy accumulator itself.

12 Claims, 1 Drawing Sheet

(51) Int. Cl.
*H02J 7/00* (2006.01)
*B60L 3/00* (2019.01)
*H02P 27/06* (2006.01)

(58) Field of Classification Search
CPC ...... H02P 1/18; H02P 1/24; H02P 1/26; H02P 1/265; H02P 1/28; H02P 1/42; H02P 1/423; H02P 1/46; H02P 1/465; H02P 1/54; H02P 3/00; H02P 3/04; H02P 3/12; H02P 3/14; H02P 3/16; H02P 3/22; H02P 3/26; H02P 5/00; H02P 6/00; H02P 6/002; H02P 6/008; H02P 6/24; H02P 7/00; H02P 9/00; H02P 9/006; H02P 21/00; H02P 23/00; H02P 25/00; H02P 27/00; H02P 27/04; H02P 27/06; H02P 29/028; H02H 7/16; H02H 7/065; B62D 5/0487; Y02T 10/7044; B60L 7/22; B60L 7/10
USPC .... 361/15, 23, 30; 318/400.01, 400.02, 700, 318/701, 721, 727, 794, 795, 817, 362, 318/370, 375, 376, 139, 140
See application file for complete search history.

(56) References Cited

U.S. PATENT DOCUMENTS

| | | | |
|---|---|---|---|
| 9,024,563 B2* | 5/2015 | Bunte | F03D 7/0224 |
| | | | 318/494 |
| 9,203,234 B2* | 12/2015 | Pence | H02H 7/06 |
| 9,233,612 B2* | 1/2016 | Kumar | B60L 9/16 |
| 10,501,095 B2* | 12/2019 | Jalla | B60L 1/003 |
| 2007/0001255 A1 | 1/2007 | Lin | |
| 2011/0041723 A1* | 2/2011 | Kumar | B60L 9/16 |
| | | | 105/35 |
| 2012/0019176 A1 | 1/2012 | Okamura | |
| 2012/0277942 A1* | 11/2012 | Vilar | B60L 50/13 |
| | | | 701/22 |
| 2014/0211344 A1* | 7/2014 | Pence | H02H 7/06 |
| | | | 361/20 |

* cited by examiner

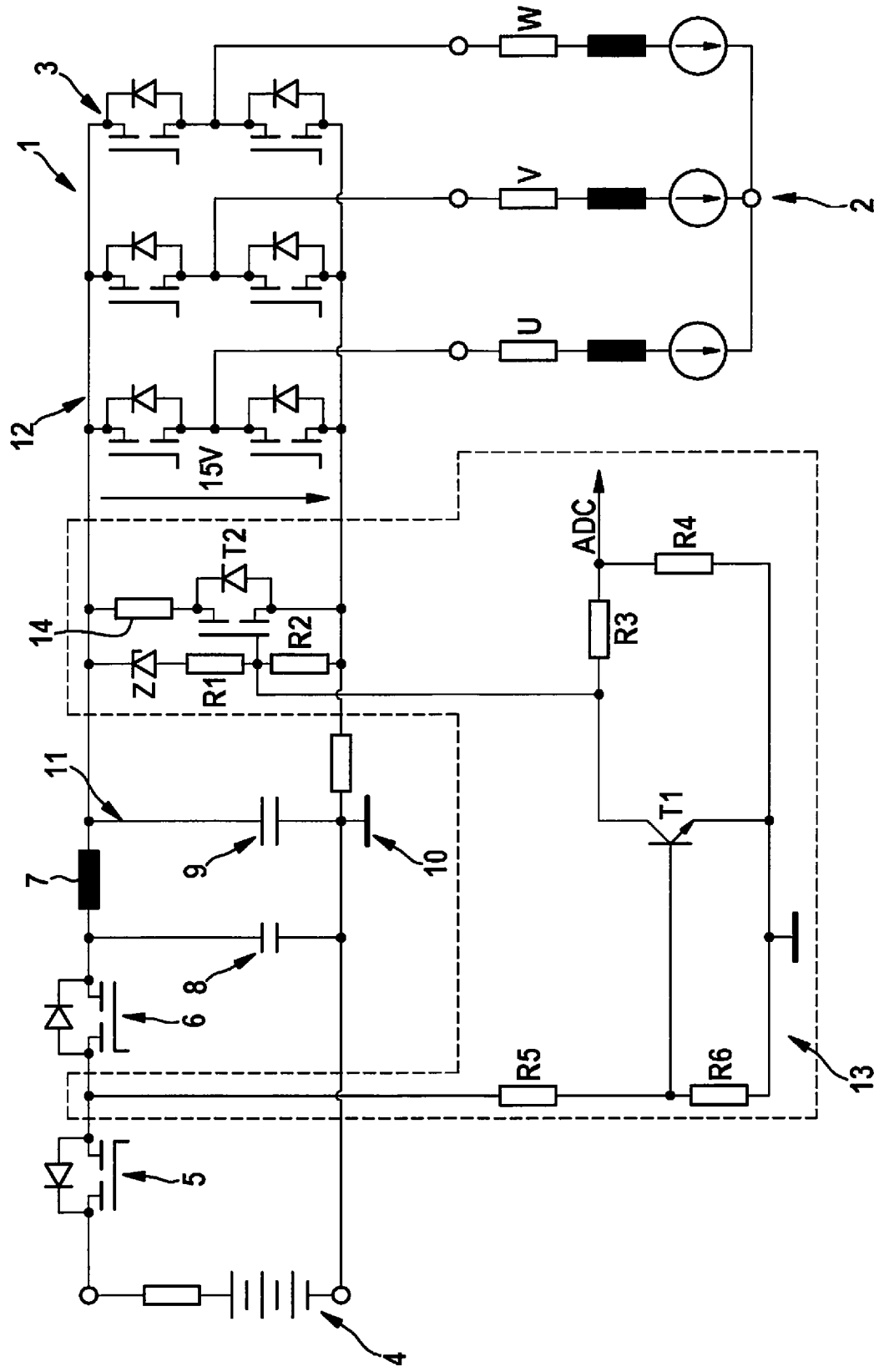

DEVICE FOR AN ELECTRIC MACHINE, IN PARTICULAR OF A MOTOR VEHICLE

FIELD OF THE INVENTION

The present invention relates to a device for an electric machine, in particular of a motor vehicle, that can at least be operated in generator mode, having an electrical energy accumulator that is connected to the electric machine by an electric circuit that has a main switch, the circuit having a motor brake circuit that is designed for feeding electrical energy generated by the electric machine in generator mode to the energy accumulator.

BACKGROUND INFORMATION

Devices of the type described at the outset are known from the related art. Thus, it is known that the electric machines can be operated in a motor mode, as well as in a generator mode. It is also known that electrical energy is dissipated as heat via an electrical resistance or is fed back into the electrical energy accumulator.

SUMMARY

The device according to the present invention has the advantage that the energy produced in generator mode is either dissipated as heat or is fed to the energy accumulator, depending on the operating state of the energy accumulator or of the main switch. To that end, the present invention provides that the motor brake circuit be designed to convert the electrical energy into heat in the case of a failure of the main switch, of a connection of the circuit to the energy accumulator and/or of the energy accumulator itself. Thus, there is a fallback position in the event that it is not possible to feed energy into the vehicle electrical system or into the energy accumulator. A redundant motor brake is made available for converting the kinetic energy into electrical energy, thereby enhancing the availability of the motor brake.

One preferred embodiment of the present invention provides that the motor brake circuit have at least one electrical resistor for converting electrical energy into heat. This hereby makes possible a simple dissipation of electrical energy as heat into the ambient environment.

It is also preferably provided that the motor brake circuit be designed to independently feed the energy produced in generator mode either to the energy accumulator or to the resistor, as a function of the operating state of the main switch, of the connection to the energy accumulator and/or of the energy accumulator itself. Thus, the motor brake circuit independently determines whether the energy is fed to the energy accumulator or to the resistor. The energy line is thereby automatically switched over by a suitable interconnection.

It is also preferred that the circuit have a bridge circuit having an intermediate circuit, which is provided for operating the electric machine and includes at least one intermediate circuit capacitor, and that the motor brake circuit be assigned to the intermediate circuit. These types of circuits are generally known. Electric machines are mostly driven by a bridge circuit, for example, having a B6 bridge, each bridge having a plurality of semiconductor switches for selectively energizing phases of the electric machine. It should be noted that the motor brake circuit is assigned to the intermediate circuit, respectively intermediate circuit capacitor of such a circuit.

It is also preferably provided that the motor brake circuit have a voltage-limiting device for the intermediate circuits that defines a limit voltage. The maximum speed of the electric machine in generator mode is limited by the voltage limitation.

It is also preferably provided that the motor brake circuit have one or a plurality of Zener diodes to which the electrical resistor is connected in parallel, at least one switching device that activates or deactivates the resistor being assigned thereto. In particular, the Zener diode defines the voltage limitation. In response to exceedance of the limit voltage, the Zener diode becomes conductive and thereby switches the switching device, in particular, in order to feed the electrical energy to the resistor or the energy accumulator.

It is also preferably provided that the switching device include a semiconductor switch, in particular a MOSFET. As a result, the switching device is cost-effective to manufacture and is not subject to mechanical wear. The switching is carried out simply and without significant energy expenditure.

The semiconductor switch is preferably driven by a voltage divider which is connected in outgoing circuit to the Zener diode. This offers a simple and cost-effective approach for operating a semiconductor switch.

Furthermore, the motor brake circuit preferably includes a device for monitoring the operating state thereof. This makes it possible to ensure during operation that the motor brake circuit is functioning properly.

The motor vehicle according to the present invention is distinguished by the device according to the present invention. The already mentioned advantages are thereby derived.

BRIEF DESCRIPTION OF THE DRAWING

The FIGURE illustrates a device for operating an electric machine.

DETAILED DESCRIPTION

In a simplified representation, the only FIGURE shows a device 1 for operating an electric machine 2. In motor mode, electric machine 2 generates a driving torque and, in a generator mode, a braking torque.

Device 1 has a circuit 3 via which electric machine 2 is connected or connectable to an energy accumulator 4. Energy accumulator 4 is followed by a main switch 5 that connects the main supply line to the energy accumulator or disconnects it therefrom. Main switch 5 is followed by a polarity-reversal protection device 6 having a downstream filter 7 in the form of an inductor. Upstream and downstream of inductor 7, two intermediate circuit capacitors 8 and 9 are connected here in parallel to energy source 4; moreover, a shunt 10 for measuring current being assigned to intermediate circuit capacitor 9.

This intermediate circuit 11 is followed by a bridge circuit 12 in the form of a B6 bridge having three half bridges, which each have two semiconductor switches; in each instance, each of the half bridges being connected to a phase U, V, W of electric machine 2.

A motor brake circuit 13, which is marked here by a dashed-line box, is assigned to intermediate circuit 11.

In this respect, motor brake circuit 13 is assigned to intermediate circuit 11. If energy accumulator is available, electrical energy is fed in the generator mode directly into energy accumulator 4. In the event of failure of energy accumulator 4, of the connection, or of the main switch, the motor brake is released by a semiconductor switch T1 via a voltage divider R5, R6 that is connected between main switch 5 and polarity-reversal protection device 6. Thereby released circuit 13 limits the voltage of intermediate circuit 11, here, for example, to approximately 15 volts, and thus the maximum speed of electric machine 2 in generator mode. If the voltage limit is reached or exceeded, a downstream Zener diode Z and voltage divider R1, R2, a load resistor 14 and a semiconductor switch T2, designed as a MOSFET, for example, are connected in parallel to intermediate circuit 11 in the present motor brake circuit. Resistor 14 then converts the electrical energy into heat and dissipates the same.

The voltage limit and thus the maximum speed is adjustable via Zener diode Z and R1/R2. In addition, the energy may be simultaneously converted into heat in resistor 14 and also in semiconductor switch T2. Moreover, the operating state of brake circuit 13 may be monitored via resistors R3/R4 and/or via ADC.

Should the energy accumulator fail, electric machine 2 continually accelerates in generator mode, whereby intermediate circuit 11 is first charged. If the voltage in intermediate circuit 11 reaches the limit voltage of the Zener diode, motor brake circuit 13 limits the further acceleration of electric machine 2 in the generator mode by limiting the voltage in intermediate circuit 11. The extracted energy is thereby converted into heat.

What is claimed is:

1. A device for operating an electric machine at least in generator mode, comprising:
   an electrical circuit that includes a main switch and a motor brake circuit; and
   an electrical energy accumulator connected to the electric machine by the electrical circuit, wherein:
      the motor brake circuit feeds an electrical energy generated by the electric machine in generator mode to the energy accumulator, and
      the motor brake circuit converts the electrical energy into heat in the case of a failure of at least one of:
         the main switch,
         a connection of the electrical circuit to the energy accumulator, and the energy accumulator.

2. The device as recited in claim 1, wherein the motor brake circuit has at least one electrical resistor for converting the electrical energy into heat.

3. The device as recited in claim 2, wherein the motor brake circuit independently feeds the electrical energy produced in generator mode either to the energy accumulator or the resistor, as a function of an operating state of at least one of the main switch, the connection to the energy accumulator, and the energy accumulator.

4. The device as recited in claim 2, wherein the motor brake circuit includes a Zener diode to which the electrical resistor is connected in parallel, at least one switching device that activates or deactivates the resistor being assigned to the Zener diode.

5. The device as recited in claim 4, wherein the switching device includes a semiconductor switch.

6. The device as recited in claim 5, wherein semiconductor switch includes a MOSFET.

7. The device as recited in claim 5, further comprising a voltage divider connected in an outgoing circuit to the Zener diode, wherein the semiconductor switch is driven by the voltage divider.

8. The device as recited in claim 1, wherein:
   the electrical circuit includes a bridge circuit that includes an intermediate circuit for operating the electric machine and that includes at least one intermediate circuit capacitor, and
   the motor brake circuit is assigned to the intermediate circuit.

9. The device as recited in claim 8, wherein the motor brake circuit includes a voltage-limiting device for the intermediate circuit that defines a limit voltage.

10. The device as recited in claim 1, wherein the motor brake circuit includes at least one device for monitoring an operating state thereof.

11. A system, comprising:
    an electric machine; and
    a device for operating the electric machine at least in generator mode, the device including:
       an electrical circuit that includes a main switch and a motor brake circuit; and
       an electrical energy accumulator connected to the electric machine by the electrical circuit, wherein:
          the motor brake circuit feeds an electrical energy generated by the electric machine in generator mode to the energy accumulator, and
          the motor brake circuit converts the electrical energy into heat in the case of a failure of at least one of:
             the main switch,
             a connection of the electrical circuit to the energy accumulator, and
             the energy accumulator.

12. The system as recited in claim 11, wherein the system is of a motor vehicle.

* * * * *